United States Patent
Hamel et al.

(10) Patent No.: US 8,646,664 B2
(45) Date of Patent: Feb. 11, 2014

(54) METHOD AND DEVICE FOR THE METERED REMOVAL OF A FINE TO COARSE-GRAINED SOLID MATTER OR SOLID MATTER MIXTURE FROM A STORAGE CONTAINER

(75) Inventors: Stefan Hamel, Wenden (DE); Eberhard Kuske, Soest (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 203 days.

(21) Appl. No.: 12/736,185

(22) PCT Filed: Jan. 23, 2009

(86) PCT No.: PCT/EP2009/000404
§ 371 (c)(1),
(2), (4) Date: Sep. 16, 2010

(87) PCT Pub. No.: WO2009/115158
PCT Pub. Date: Sep. 24, 2009

(65) Prior Publication Data
US 2011/0017786 A1  Jan. 27, 2011

(30) Foreign Application Priority Data
Mar. 17, 2008  (DE) .................. 10 2008 014 475

(51) Int. Cl.
*B05B 7/00* (2006.01)
(52) U.S. Cl.
USPC ............... 222/630; 222/195; 222/637; 222/1; 220/2; 366/107

(58) Field of Classification Search
USPC ............... 222/630, 195, 637; 110/293; 220/2; 366/107, 137
See application file for complete search history.

(56) References Cited

U.S. PATENT DOCUMENTS

| | | | | |
|---|---|---|---|---|
| 1,971,852 A | * | 8/1934 | Goebels | 366/107 |
| 2,125,913 A | * | 8/1938 | Goebels | 366/137 |
| 2,245,664 A | | 6/1941 | Gronert | |
| 2,292,897 A | * | 8/1942 | Nielsen | 366/102 |
| 2,353,346 A | * | 7/1944 | Logan | 406/88 |

(Continued)

FOREIGN PATENT DOCUMENTS

| | | |
|---|---|---|
| CA | 1 333 081 | 11/1994 |
| DE | 10 55 447 | 4/1959 |

(Continued)

*Primary Examiner* — Kevin P Shaver
*Assistant Examiner* — Michael J Melaragno
(74) *Attorney, Agent, or Firm* — Collard & Roe, P.C.

(57) ABSTRACT

The invention relates to a method and a device for the metered removal of a fine to coarse-grained solid matter or a solid matter mixture from a storage container, comprising a device for forming a fluidized bed in the discharge region or in a metering chamber of the metering container, wherein fluidization that is as optimal as possible is to be created in the lower region of such a receiving or metering container while avoiding any additional systems, mechanical elements, or extensive installations. This is achieved according to the method in that a gas is additionally introduced in the region of the metering chamber bottom for forming a fluidized bed that loosens the solid matter, and a gas is introduced via swirl nozzles for bringing about the rotation of the fluidized bed.

10 Claims, 2 Drawing Sheets

(56) References Cited

U.S. PATENT DOCUMENTS

Figure 1:
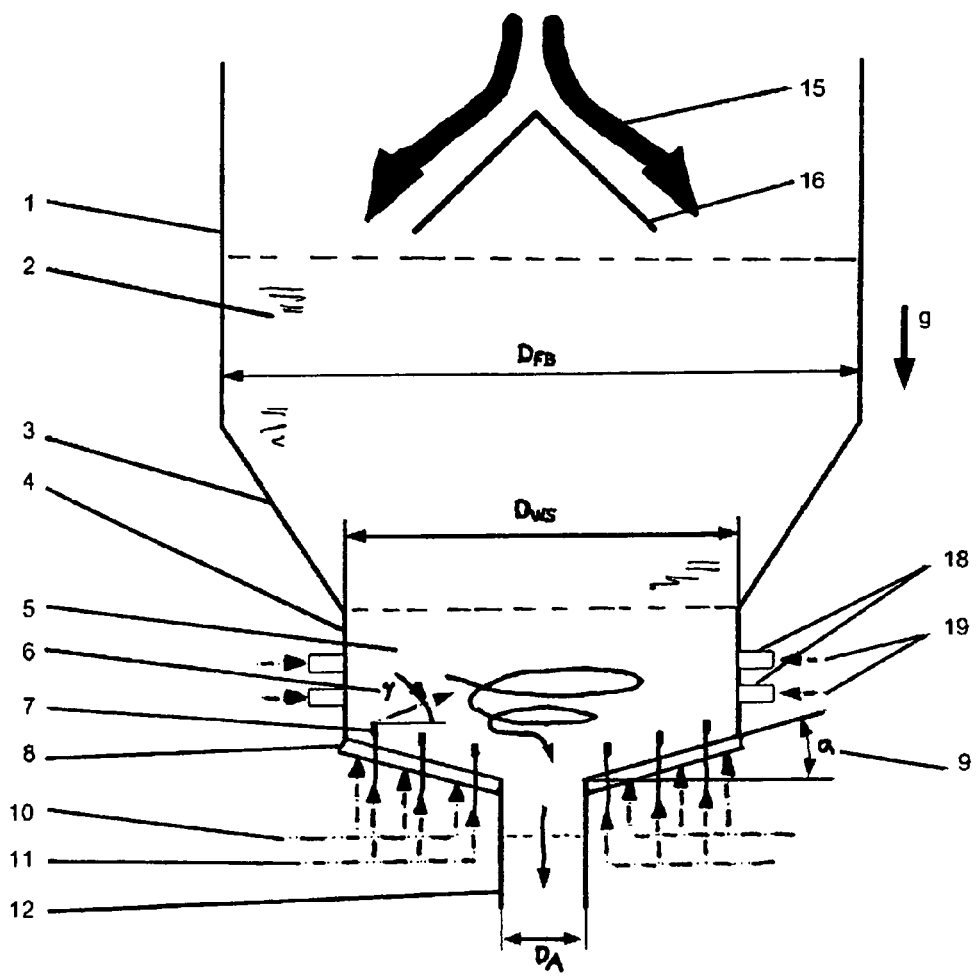

| | | | | |
|---|---|---|---|---|
| 3,097,828 | A * | 7/1963 | Grun | 366/106 |
| 3,121,593 | A * | 2/1964 | McIlvaine | 406/137 |
| 3,179,379 | A * | 4/1965 | Grun et al. | 366/134 |
| 3,237,812 | A * | 3/1966 | Kemp | 406/91 |
| 3,269,428 | A * | 8/1966 | Stockel et al. | 141/10 |
| 3,305,142 | A * | 2/1967 | Caldwell | 222/195 |
| 3,639,007 | A * | 2/1972 | Dare et al. | 406/91 |
| 3,647,188 | A | 3/1972 | Solt | |
| 3,713,564 | A * | 1/1973 | Cottrell | 222/1 |
| 3,862,707 | A * | 1/1975 | Reiter | 366/101 |
| 4,059,311 | A * | 11/1977 | Spitzer et al. | 406/93 |
| 4,413,758 | A * | 11/1983 | Walters | 222/195 |
| 4,478,517 | A | 10/1984 | Hoppe et al. | |
| 4,560,094 | A * | 12/1985 | Eales | 222/195 |
| 4,941,779 | A * | 7/1990 | Dewitz et al. | 406/138 |
| 4,966,101 | A * | 10/1990 | Maeda et al. | 122/4 D |
| 5,106,240 | A | 4/1992 | Dirkse et al. | |
| 5,129,766 | A * | 7/1992 | Dirkse et al. | 406/136 |
| 5,181,633 | A * | 1/1993 | Weber et al. | 222/195 |
| 5,469,994 | A | 11/1995 | Reh et al. | |
| 7,581,905 | B2 | 9/2009 | Berggren | |
| 2006/0013660 | A1 | 1/2006 | Berggren | |
| 2010/0025433 | A1 | 2/2010 | Berggren | |

FOREIGN PATENT DOCUMENTS

| | | |
|---|---|---|
| DE | 1 130 368 | 5/1962 |
| DE | 26 32 795 | 2/1977 |
| DE | 28 31 208 | 3/1979 |
| DE | 32 08 499 | 3/1983 |
| DE | 39 10 073 | 1/1990 |
| DE | 41 08 048 | 9/1992 |
| DE | 689 02 594 | 1/1993 |
| DE | 195 21 766 | 1/1997 |
| DE | 197 15 973 | 10/1998 |
| DE | 603 12 015 | 11/2007 |
| EP | 0 348 008 | 12/1989 |
| EP | 0 503 423 | 9/1992 |
| EP | 0 531 758 | 3/1993 |
| EP | 0 626 196 | 11/1994 |
| EP | 1 551 736 | 7/2005 |
| FR | 1 019 215 | 1/1953 |
| GB | 858 107 | 1/1961 |
| GB | 940 506 | 10/1963 |
| GB | 2 004 993 | 4/1979 |
| GB | 2 031 291 | 4/1980 |
| SU | 1 674 945 | 9/1991 |
| WO | WO 89/11378 | 11/1989 |
| WO | WO 98/11378 | 3/1998 |
| WO | WO 2004/085578 | 10/2004 |

* cited by examiner

METHOD AND DEVICE FOR THE METERED REMOVAL OF A FINE TO COARSE-GRAINED SOLID MATTER OR SOLID MATTER MIXTURE FROM A STORAGE CONTAINER

CROSS REFERENCE TO RELATED APPLICATIONS

This application is the National Stage of PCT/EP2009/000404 filed on Jan. 23, 2009, which claims priority under 35 U.S.C. §119 of German Application No. 10 2008 014 475.4 filed on Mar. 17, 2008, the disclosure of which is incorporated by reference. The international application under PCT article 21(2) was not published in English.

The invention is directed at a method for metered removal of a fine-grained to coarse-grained solid material or solid material mixture from a storage container, having a device for forming a fluidized bed in the discharge region or in a metering chamber of the metering container, as well as at a corresponding device for implementing the method.

In order to be able to feed fine-grained fuels, for example, from a storage container to burners, it is known to undertake fluidization in the lower region of the storage container and/or corresponding metering container, whereby the feed is then undertaken from this region, for example by means of a gas in corresponding pipelines. EP 531 758 B1, EP 626 196 B1, or DE 28 31 208 C, DE 39 10 073 A, and DE 197 15 973 A can be mentioned as examples of such a method of procedure. DE 689 02 594 T or DE 41 08 048 C describe providing gas feed elements, such as lances or pipelines with blow-out openings, positioned at the funnel edge, to mention only a few examples.

In order not to have to fluidize the entire volume of a container, which would lead to a very great demand for energy and to a corresponding demand for large amounts of gases, it is also known to provide fluidization only in the lower region of such a container, as is described in DE 28 31 208 C, which has already been mentioned above.

In the case of solid materials that are very difficult to fluidize, it is known to support the fluidization by means of installations, for example of stirrers or the like, in order to particularly achieve as homogeneous a fluidization as possible. Because of comparatively high pressures of up to 8 MPa, great demands are made on the seals, particularly of the shaft ducts. In this connection, the high pressure and the moving parts in the solid material lead to a comparatively great tendency to break down, which impairs the availability of the system as a whole accordingly.

This is where the invention takes its start, having the task of creating the most optimal fluidization possible in the lower region of such accommodation or metering containers, while avoiding additional systems, mechanical elements, or complicated installations.

This task is accomplished, according to the invention, with a method of the type indicated initially, in that a gas is additionally introduced in the region of the metering chamber bottom, to form a fluidized bed that loosens up the solid material, and a gas is additionally introduced by way of swirl nozzles, in order to put the fluidized bed into rotation. By means of these two gas streams, which serve different purposes, it is possible to achieve optimal fluidization with a very homogeneous formation of the fluidized bed, so that in this way, homogeneous removal of fuel, for example, is possible.

The invention can be used in particularly advantageous manner for metering fine-grained to dust-like fuel from a storage container that is pressurized, for a pressurized gasification process, in which finely distributed fuels, for example dust-like (<0.5 mm) fuels, for example coal, petroleum coke, biological waste, or fuels or liquid fuels such as oil, tar, refinery residues, and other liquid residues, which can be atomized in the gasification unit, are reacted in suspended form, at a low particle charge (<50 kg/m$^2$; no fluidized bed) with gasification agents that contain oxygen, at elevated pressure, at temperatures below the slag melting point. Embodiments of the method of procedure according to the invention are evident from the dependent claims. In this connection, it can be provided that the gas stream that produces swirl is introduced tangentially or at an angle relative to the metering container wall and/or at an angle relative to the horizontal plane.

In this connection, it is practical if the tangential angle is set at between 0 and 80°, and the angle assumed relative to the horizontal is set at between 0 and 45°, as the invention also provides.

It is also advantageous if the velocity achieved over the entire gas feed, with reference to the cross-section of the fluidized region in the metering container, is set to between 0.5 multiple and 10 multiples of the minimal fluidization velocity of the solid material, preferably between 1 multiple and 5 multiples. The measures indicated above lead to an optimal stirring effect, by the pneumatic route, within the material to be conveyed, so that a correspondingly homogeneous gas/solid material stream can be removed by way of a central outlet opening, for example.

To accomplish the task, the invention also provides a device, namely for metered removal of fine-grained to coarse-grained solid material or solid material mixtures from a metering container having at least one metering chamber that lies at the bottom in the direction of gravity, having gas feed openings suitable for forming a fluidized bed in the chamber bottom, which chamber is characterized in that aside from the gas feed devices that serve for fluidization, additional swirl nozzles that impact the metering chamber are provided. As has already been indicated above, a stirring effect in the fluidized bed can be achieved by means of the swirl nozzles, with the related advantages.

Embodiments of the device are evident from the other dependent claims. Thus, for example, it is provided, in an embodiment of the invention, that the swirl nozzles are provided in the cylindrical wall of the metering chamber and/or passing through the fluidization chamber bottom.

It is practical if the swirl nozzles have a tangential exit of the gas stream with reference to the chamber wall and/or to an exit direction set at an angle with reference to the horizontal surface, whereby the angle, in each instance, can lie in the range between 0 and 45°.

The invention also provides that the metering container is equipped with at least two metering chambers in the region of the container bottom.

The metering chamber bottom itself can also be configured in funnel shape, with a work angle of 0 to 60°, particularly of 10 to 20° relative to the horizontal.

Other characteristics, details, and advantages of the invention are evident from the following description and using the drawing. This shows, in FIG. 1 a simplified section through a device according to the invention, and in FIG. 2 a top view of the metering chamber, with flow arrows of the fluidized bed formed in it.

The storage container indicated in general with 1 has a bulk solid material 2. The storage container 1 is equipped with a transition funnel 3 at its lower end. In this connection, in FIG.

1, $D_{FB}$ refers to the diameter of the solid bed, $D_{WS}$ refers to the diameter of the fluidized bed, and $D_A$ refers to the inside diameter of the run-off.

The transition funnel 3 leads into an essentially cylindrical metering chamber 4, whereby a fluidized bed can be produced in the metering chamber 4. The solid material that is fluidized here is designated as 5, whereby 6 indicates the outflow angle with reference to the horizontal plane of the gas stream from the swirl nozzles indicated with 7. Nitrogen, air, carbon dioxide, recirculated flue gas, or synthesis gas, or mixtures of these gases, for example, can be used as the gas.

The metering chamber 4 also has a slightly funnel-shaped bottom, which is configured as a gas distributor bottom 8; the corresponding gas feed to the gas distributor bottom is indicated with 10, while the gas feed to the swirl nozzles is indicated with 11.

The fluidized fuel can be removed by way of a central outlet opening 12 and can be fed to burners, for example, something that is not shown in any detail in the figures.

Figure 2:
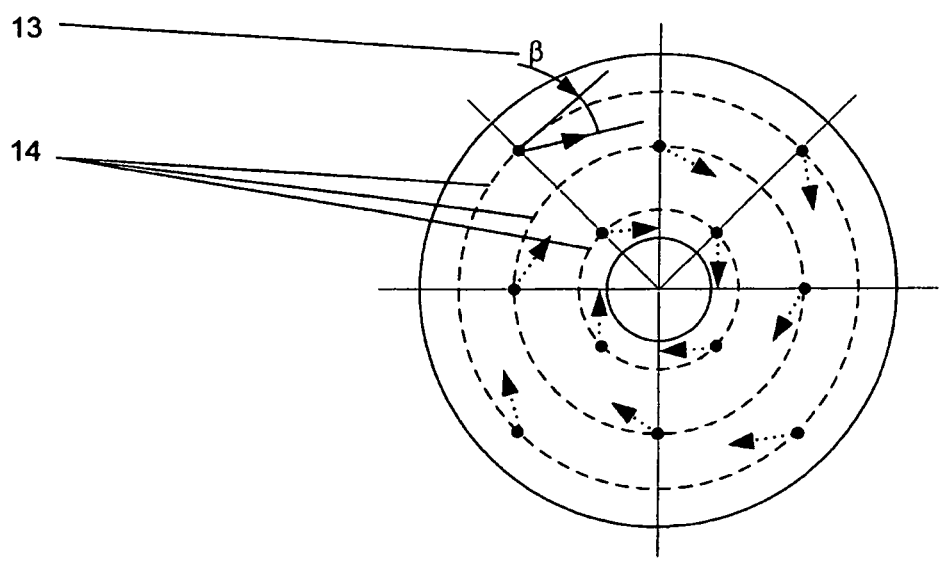

In FIG. 2, the gas exit angle with reference to the tangential direction is indicated with 13; the gas stream from the swirl nozzles assumes this angle in order to thereby allow the fluidized content of the metering chamber 4 to circulate in a manner as indicated by small arrows in FIG. 2. FIG. 2 also shows the swirl nozzle circles with broken lines 14.

In order to minimize the filling pulse as much as possible during feed of the solid material, indicated with 15, devices such as baffles or the like can be provided within the metering container 1, as indicated with 16.

The swirl nozzles 7 can not only pass through the gas distributor bottom 8, they can also be provided in the perpendicular walls of the metering chamber 4, as indicated with 18, whereby the corresponding gas feed carries the reference symbol 19. The work angle of the gas distributor bottom 8 is indicated with α or 9. The gas distributor bottom can be formed from porous material, or can have bores or nozzles or combinations of these devices.

Of course, the exemplary embodiment of the invention as described can be modified in many different respects, without departing from the fundamental idea; in particular, a control can be provided for cyclical feed of the fluidization gas and/or of the swirl gas, the gas feeds can be controlled synchronously or one after the other, and the like.

The invention claimed is:

1. Method for metered removal of a fine-grained to coarse-grained solid material or solid material mixture from a storage container, having a device for forming a fluidized bed in the discharge region or in a metering chamber of the storage container, wherein a gas forming a first gas flow is additionally introduced in the region of the metering chamber bottom, to form a fluidized bed that loosens up the solid material, and a gas forming a second gas flow is additionally introduced by way of swirl nozzles vertically passing through the metering chamber bottom, in order to put the fluidized bed into rotation, whereby the first gas flow is separate from the second gas flow, and whereby the solid material is drawn off from the metering chamber toward the bottom, in the direction of gravity.

2. Method according to claim 1, wherein the gas stream that produces the swirl is also introduced tangentially or at an angle relative to the storage container wall and/or at an angle relative to the horizontal plane.

3. Method according to claim 2, wherein the tangential angle is set at between 0° and 80°, and the angle assumed relative to the horizontal is set at between 0° and 45°.

4. Method according to claim 1, wherein the velocity achieved over the gas feed, with reference to the cross-section of the fluidized region in the storage container, is set to between 0.5 multiple and 10 multiples of the minimal fluidization velocity of the solid material, preferably between 1 multiple and 5 multiples.

5. Device for metered removal of fine-grained to coarse-grained solid material or solid material mixtures from a storage container having at least one metering chamber that lies at the bottom in the direction of gravity, having gas feed openings suitable for injecting a first gas flow to form a fluidized bed in the at least one metering chamber bottom, wherein aside from the gas feed devices that serve for fluidization, additional swirl nozzles vertically passing through the at least one metering chamber bottom that impact the at least one metering chamber via injecting a second gas flow into the at least one metering chamber and an outlet opening that is directed downward in the direction of gravity are provided, and wherein the first gas flow is separate from the second gas flow.

6. Device according to claim 5, wherein the swirl nozzles are also provided in the cylindrical wall of the metering chamber.

7. Device according to claim 5, wherein the swirl nozzles have a tangential exit or another exit angle of the gas stream with reference to the chamber wall and/or an exit direction set at an angle with reference to the horizontal surface, whereby the angle, in each instance, lies in the range between 0° and 80°.

8. Device according to claim 5, wherein the at least one metering chamber comprises a first metering chamber in the region of the container bottom and a second metering chamber in the region of the container bottom, wherein the first metering chamber comprises first gas feed openings, first swirl nozzles, and a first cylindrical wall, and wherein the second metering chamber comprises second gas feed openings, second swirl nozzles, and a second cylindrical wall.

9. Device according to claim 5, wherein the metering chamber bottom is configured in funnel shape, with a work angle in a range of 0° to 60°, relative to the horizontal.

10. Device according to claim 9, wherein the work angle is in a range of 10° to 20° relative to the horizontal.

* * * * *